US012175955B2

(12) United States Patent
Tourison

(10) Patent No.: US 12,175,955 B2
(45) Date of Patent: Dec. 24, 2024

(54) INSTRUMENT HOLDER APPARATUS AND SYSTEM AND METHOD OF USE

(71) Applicant: Steven Tourison, Newtown, PA (US)

(72) Inventor: Steven Tourison, Newtown, PA (US)

( * ) Notice: Subject to any disclaimer, the term of this patent is extended or adjusted under 35 U.S.C. 154(b) by 252 days.

(21) Appl. No.: 17/976,354

(22) Filed: Oct. 28, 2022

(65) Prior Publication Data

US 2024/0144899 A1 May 2, 2024

(51) Int. Cl.
*G10G 5/00* (2006.01)

(52) U.S. Cl.
CPC .................................... *G10G 5/00* (2013.01)

(58) Field of Classification Search
CPC .......... G10G 5/00; G10D 1/08; A47B 23/004; A47G 1/16; A47F 7/433
See application file for complete search history.

(56) References Cited

U.S. PATENT DOCUMENTS 5,941,490 A * 8/1999 Pearse .................... G10G 5/00 248/302

* cited by examiner

*Primary Examiner* — Kimberly R Lockett

(74) *Attorney, Agent, or Firm* — Michael A. Pollock; THE POLLOCK Group, LLC

(57) ABSTRACT

An instrument holder body having a first and second wall distal the first wall, the second wall portioned into a first side portion, a second side portion, and a central portion with the central portion interposed between the first and second side portions. The body further having a first side wall and a second side wall distal to the first wall, and the first and second side walls being adjacent and sharing an interface with the first wall and the second wall. The holder body further having a top and a bottom wall distal to the top wall, the top and bottom walls having adjacency and sharing an interface with the first wall and the second wall and the third wall and the fourth walls. The holder body also having a first protrusion extending outward from the first side portion of the second wall, the first protrusion having a first protrusion end and an inner portion inwardly biased towards the central portion of the second wall. The body further having a second protrusion, extending outwardly from the second side portion of the second wall, distal to the first protrusion and having a second protrusion end and having an inner portion inwardly biased towards the central portion of the second wall. A cavity is formed between the inner portion of the first protrusion and the inner portion of the second protrusion, the cavity orientated with a first opening oriented towards the top wall and a second opening distal the first opening oriented towards the bottom wall. Additionally, a third opening is formed therebetween the first protrusion and the second protrusion ends where an instrument neck may pass therethrough while being placed into the cavity whereby the holder body releasably holds the neck of the instrument, such that the instrument and holder can be supported by vertical surface for storage.

17 Claims, 15 Drawing Sheets

INSTRUMENT HOLDER APPARATUS AND SYSTEM AND METHOD OF USE

BACKGROUND OF THE INVENTION

Field of the Invention

The present invention relates to a mobile instrument stand to maintain the instrument in a generally upright position.

Background

Many people play a musical instrument or instruments. These musicians are tasked with placing their musical instrument in a supported fashion when not using the instrument for a time, so as to place the instrument out of the way and to not have the musical instrument fall and become damaged. Wall and floor support systems have been developed to hold the instrument on the floor and the wall but are cumbersome due to the multiple holders and the floor support being a general tripping hazard. In addition, wall supports have been developed for supporting instruments but are either fixed to the wall and/or cannot effectively perform on a generally vertical fixture/wall. It would be beneficial to provide a singular instrument support which can releasably attach to the instrument and provide support for the instrument by releasable engagement with a generally vertical fixture, such as a wall.

SUMMARY OF THE INVENTION

This summary is an introduction of concepts which are further discussed in the Detailed Description. This summary is not intended to identify key features or essential features of the claimed subject matter, nor is it intended to be used to limit the scope of the claimed subject matter.

In a first exemplary embodiment, the present invention is at least one of an instrument holding system and apparatus holder body having a first wall and a second wall distal the first wall, the second wall portioned into a first side and a central and second side portions with the central portion interposed between the first and second sides. The body further having a first side wall and a second side wall distal to the first side wall, and each of the first side wall and the second side walls sharing an interface with the first wall and the second wall, and each of the first and second side wall having adjacency with the first wall and second wall. The body further having a top and bottom wall distal to the top wall, the top and bottom each being adjacent with the first wall and the second wall and the third wall and the fourth wall, and each of the top wall and bottom wall sharing an interface with the first wall and the second wall and the third wall and the fourth walls. The body also having a first protrusion extending outwardly from the first side portion of the second wall, the first protrusion having a first protrusion end and an inner portion inwardly biased towards the central portion of the second wall. The body further having a second protrusion extending outwardly from the second side portion of the second wall, distal to the first protrusion and the second protrusion having a second protrusion end and having an inner portion inwardly biased towards the central portion of the second wall. A cavity is formed between the inner portion of the first protrusion and the inner portion of the second protrusion, the cavity orientated with a first opening oriented towards the top wall and a second opening distal the first opening oriented towards the bottom wall. Lastly, a third opening is formed therebetween the first protrusion end of the first protrusion and the second protrusion end of the second protrusion. The neck of an instrument, such as a guitar, passes therethrough the third opening and is releasably placed into the cavity whereby the instrument holder body holds the instrument neck such that the instrument is releasably supported through the holder body being supported by a generally vertical and/or upright surface. The user can then remove the instrument from the cavity via the third opening to disengage the holder from the instrument.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
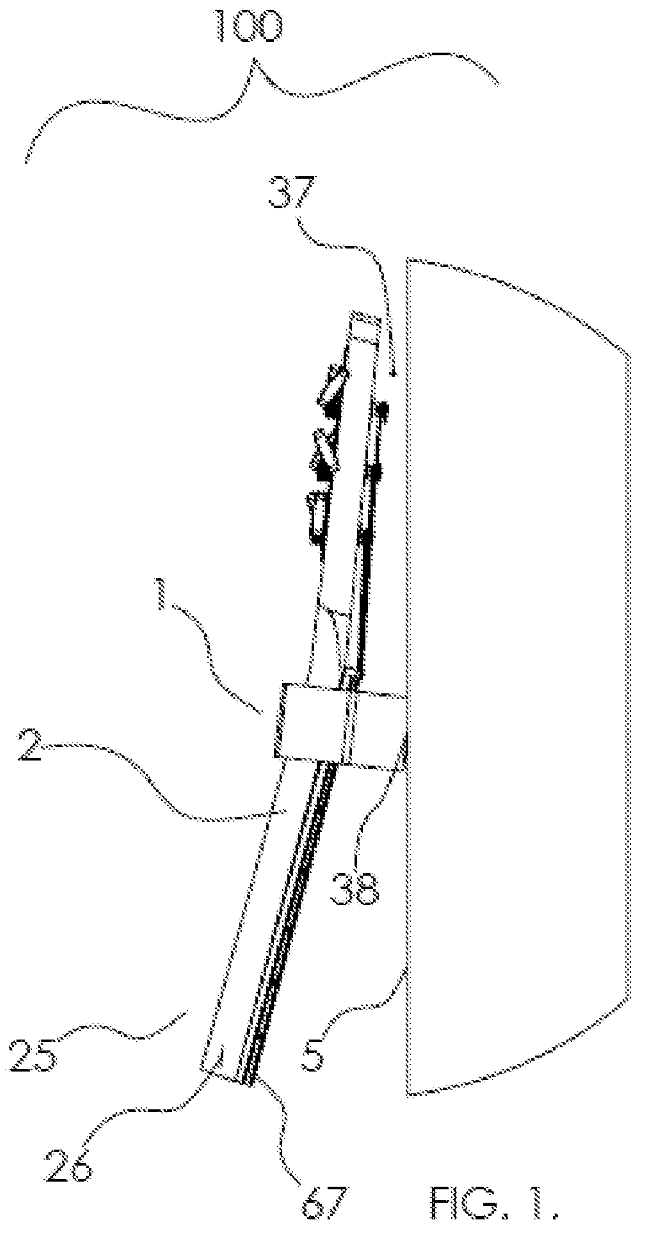
FIG. 1 shows a side view of an instrument holder and system in a first exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Additionally for purposes of this description the terms "connected," "linked," "attached," "associated," "united," "coupled," "joined," "combined," "banded," others not mentioned here, refer to any manner known in the art or later developed wherein any item or items are brought together into contact or association in some respect. Additionally, the interposition of one or more additional elements may be contemplated, although not required. Conversely, the terms "directly coupled," "directly connected," etc., imply the absence of such additional elements.

Additionally, for purposes of this description, the terms "process," "step," "steps," "system," "method," "operation," may be used interchangeably and are used to describe a method of performing at least one a series of actions and steps to generally or specifically achieve a particular result.

Referring FIG. 1, an instrument holder system 100 comprising instrument 25 and instrument neck 2 and instrument neck front 67 and instrument rear surface 26 and instrument holder 1 and fixture 5 are shown. Referring FIG. 1, this first exemplary embodiment illustrates holder 1 releasably engaged to instrument 25 providing support of instrument 25 thereunto fixture 5 through contact area 38. In this way, space 37 of FIG. 1 is maintained through the use of instrument holder system 100, ensuring that contact area 38 is the support of instrument holder 1 and instrument 25, such as a guitar or other stringed instrument.

Figure 2A:
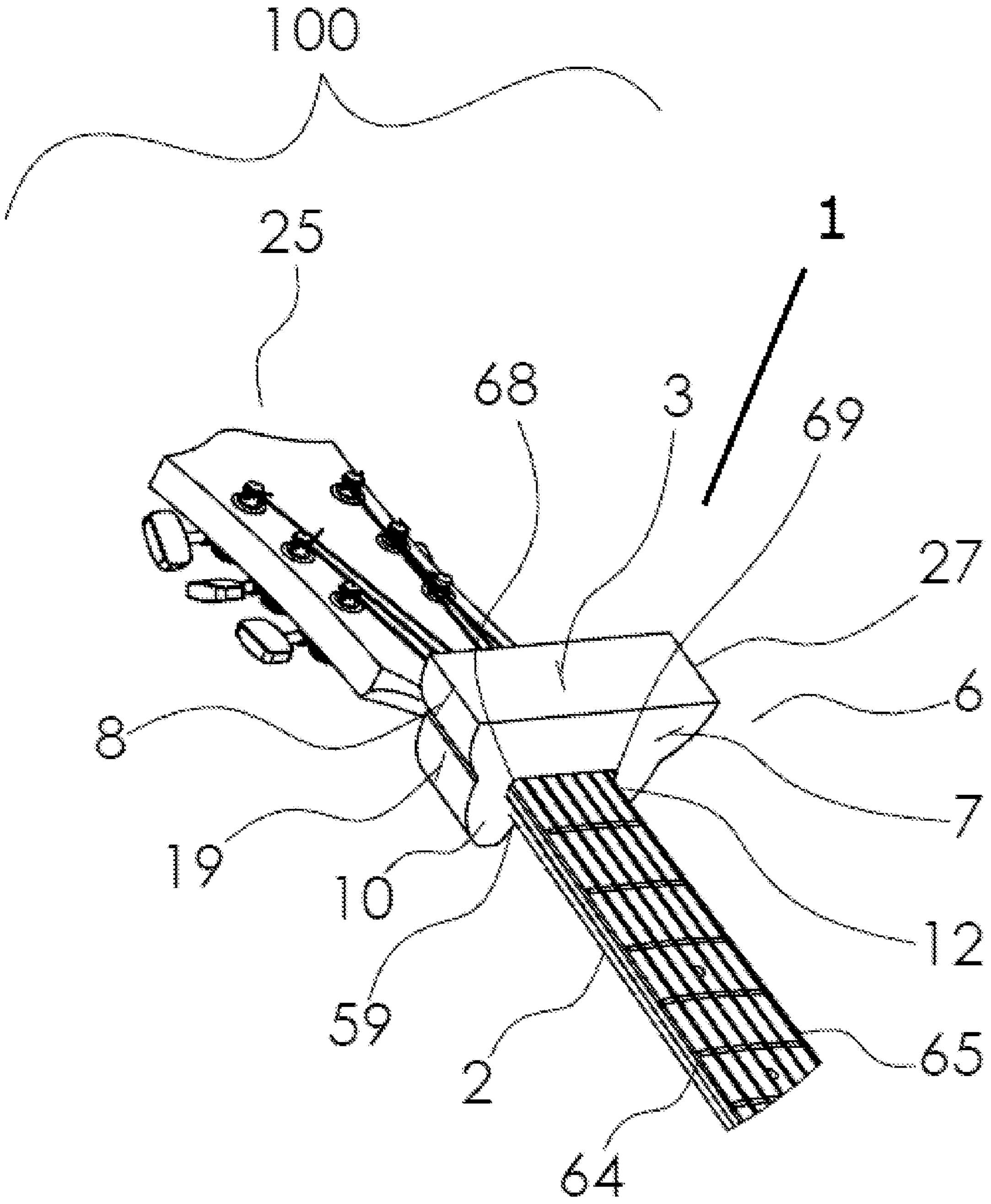
FIG. 2A shows a front right perspective view of an instrument holder and system in a first exemplary embodiment of the present invention.
Figure 2B:
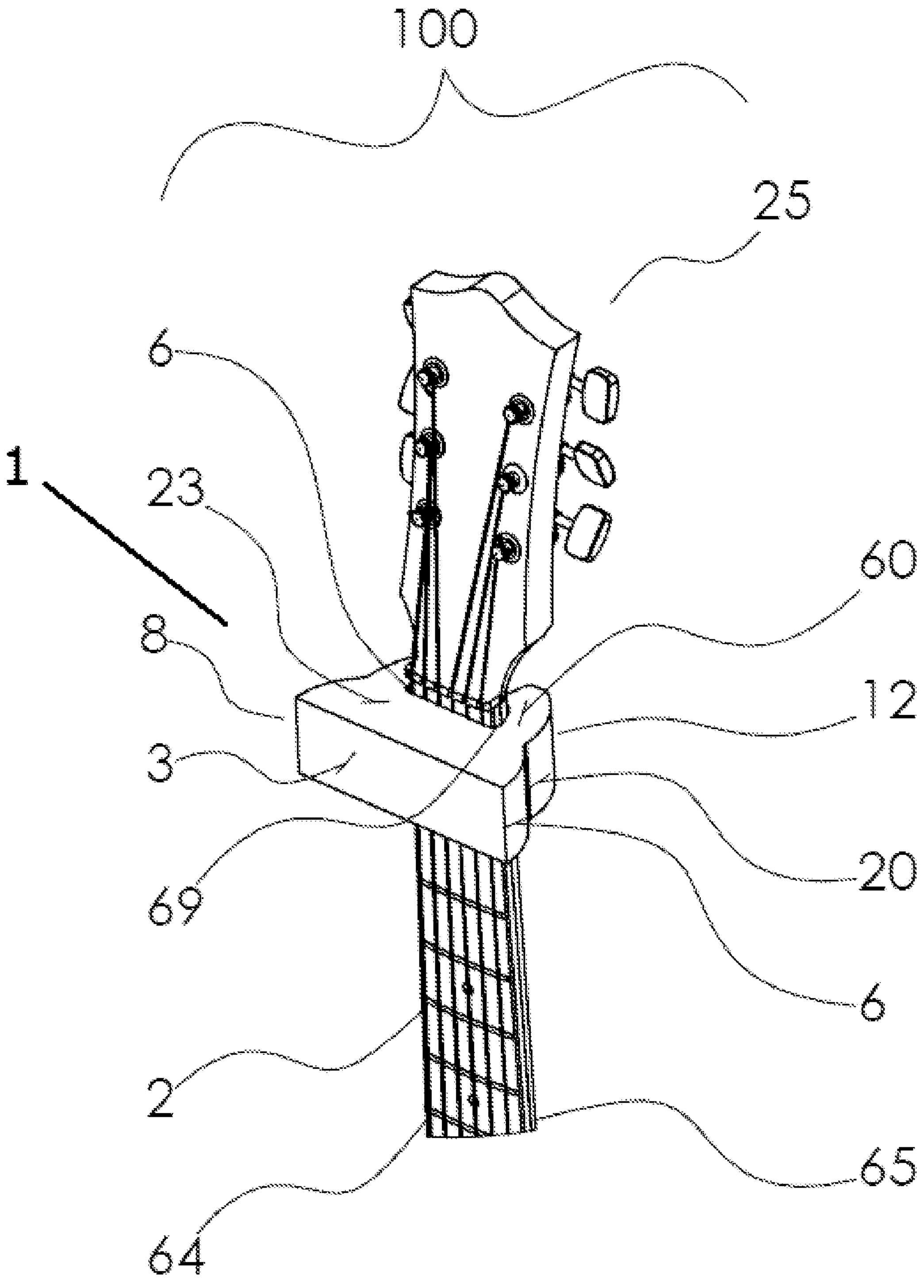
FIG. 2B shows a front left perspective view of an instrument holder and system in a first exemplary embodiment of the present invention.
Figure 2C:
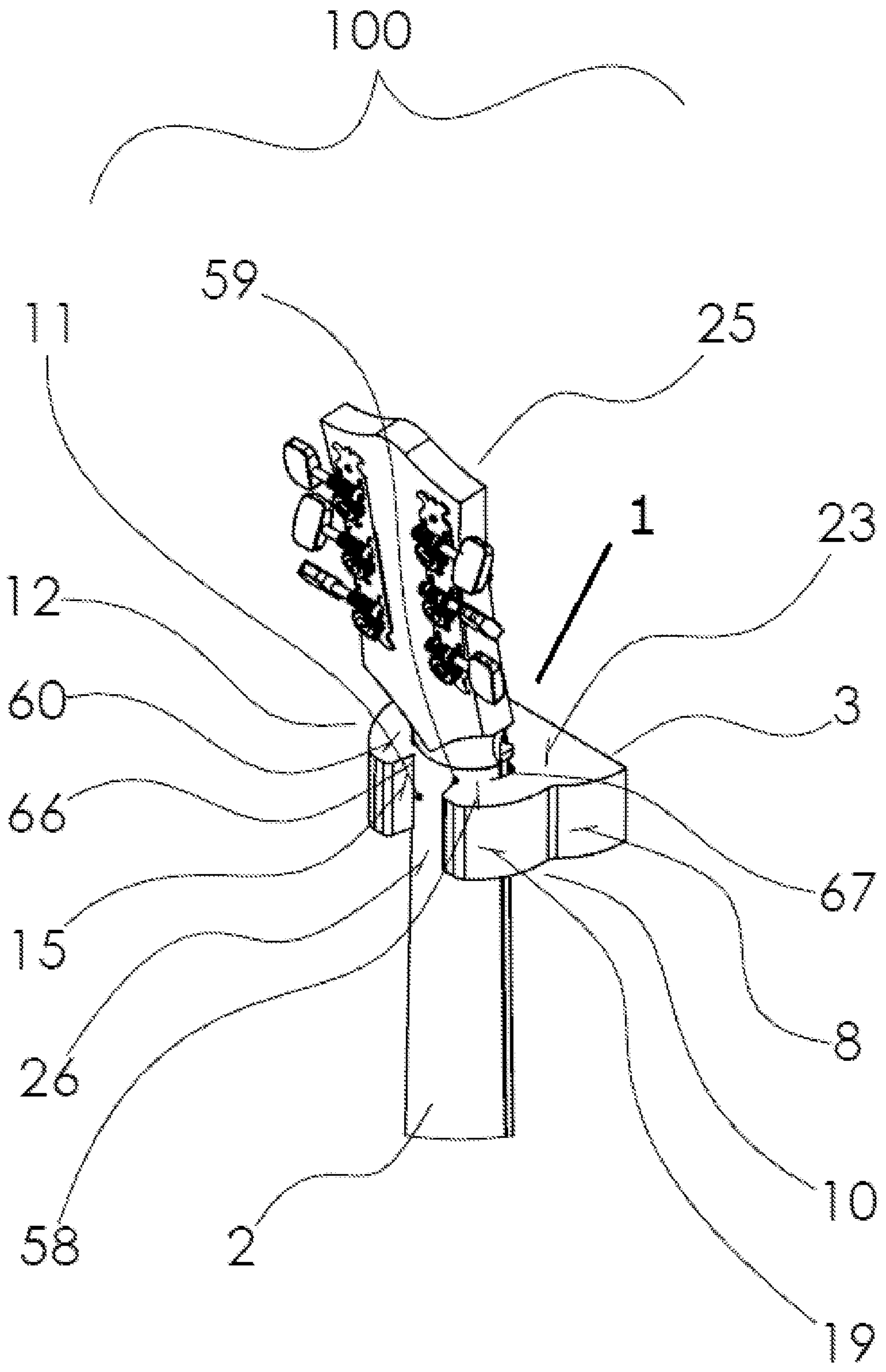
FIG. 2C shows a rear right perspective view of an instrument holder and system in a first exemplary embodiment of the present invention.

Referring FIGS. 2A, 2B and 2C in this first exemplary embodiment, instrument holder system 100 is shown with instrument holder 1 releasably engaged therewith instrument 25. Instrument 25 is illustrated as a guitar in this first exemplary embodiment, but could be any type of musical instrument, such as a string instrument, wind instrument, others not mentioned here. Referring FIGS. 2A, 2B, and 2C, instrument holder 1 is comprised of wall 3 and wall 7 and wall 8 and wall 6 and protrusion 10 and protrusion 12 and surface 19 and surface 20 and wall 23 and opening 11 and neck 2 and neck rear 26 and interface 27 and surface 58 and surface 60 and instrument side 64 and instrument side 65 and contact 59 and contact 66 and neck front contact 67 and contact 69 and protrusion end 15.

Referring FIGS. 2A, 2B and 2C in this first exemplary embodiment, wall 23 may be described as oriented upwards, such as a top wall of instrument holder 1, and wall 7 is oriented downwards, such as a bottom wall of instrument holder 1. While this description of wall 23 being described as oriented upwards as a top and wall 7 being oriented downwards as a bottom, instrument holder 1 can also be reversible in that wall 7 can be placed in an upwards orientation as a top and wall 23 placed in the downwards orientation as a bottom to provide the same function of instrument holder 1 as described herein.

Figure 3A:
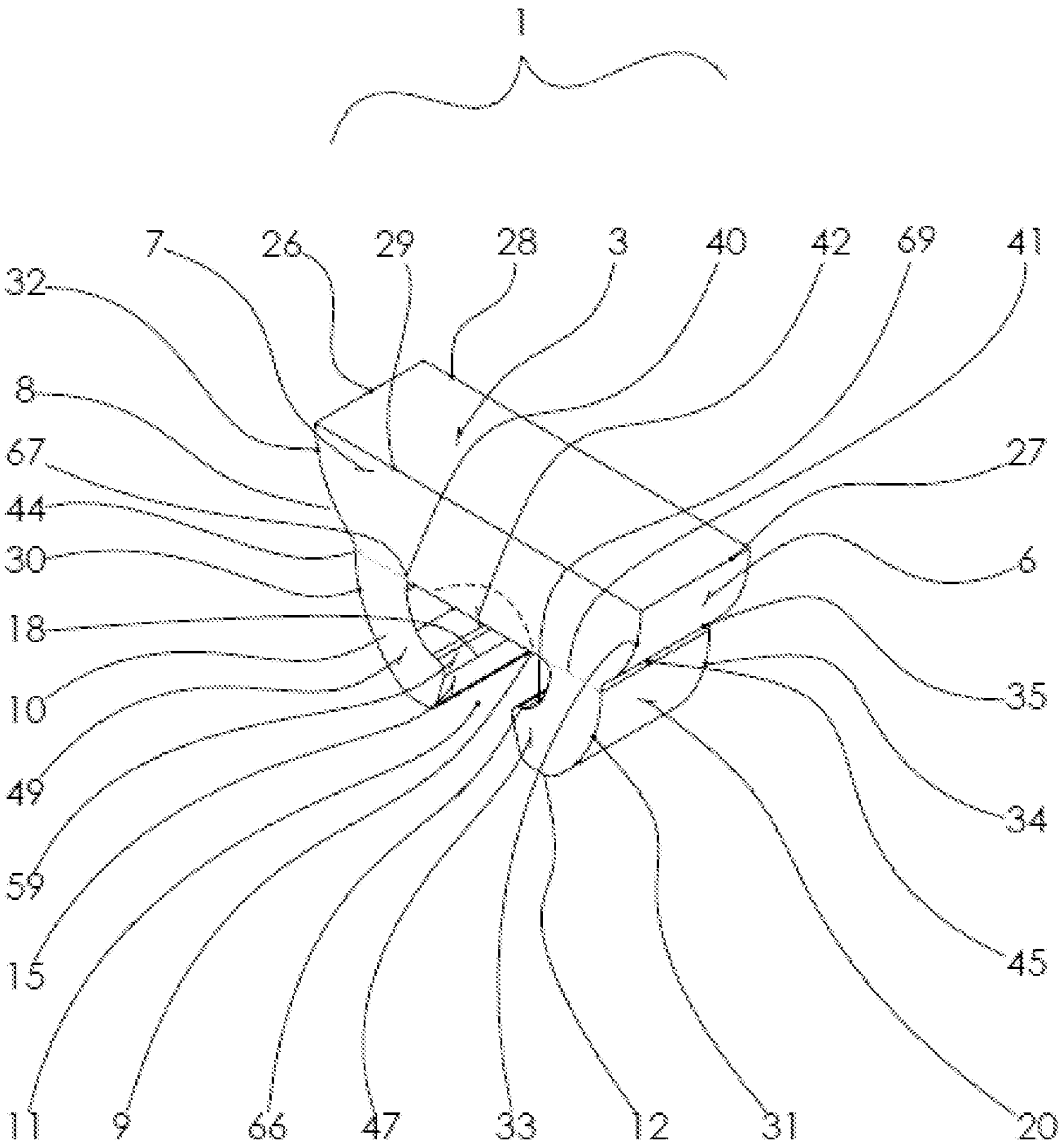
FIG. 3A shows a front bottom perspective view of an instrument holder in a first exemplary embodiment of the present invention.

Referring FIGS. 2A, 2B and 2C in this first exemplary embodiment, the releasable engagement of neck 2 of instrument 25 by instrument holder 1 is provided by placing neck 2 therethrough opening 11 of instrument holder 1 such as shown in FIG. 2C. Referring FIGS. 2A, 2B and 2C, at least one of protrusion 10 and protrusion 12 and at least one portion of instrument holder 1 has enough flexibility to flex to increase the size of opening 11 to allow the passage of neck 2 of instrument 25 thereunto and therefrom instrument holder 1 via opening 11, such as shown in FIGS. 2C and 3A. The flexibility of this at least one of protrusion 10 and protrusion 12 and at least one portion of holder 1 also provides at least one of releasable engagement and gripping engagement between instrument holder 1 and neck 2. In this first exemplary embodiment, and neck front 67 of FIG. 1 is shown coincident with rear and/or back wall 9 of FIGS. 3A, 3B and 3C. Additionally, the interposed neck rear surface, such as neck rear surface 26 of FIG. 2C could be oriented coincident with the back wall of the holder body.

Referring FIG. 2C contact point 66 and contact point 59 are shown as at least two potential points of contact between instrument holder 1 and instrument rear section 26 providing a grip between instrument holder 1 and instrument 25.

Referring FIGS. 2B and 2C, contact point 67 and contact point 69 are shown as two additional points of points of contact between instrument side 64 and instrument 65 instrument holder 1 and instrument providing a grip between instrument holder 1 and instrument 25.

Figure 3B:
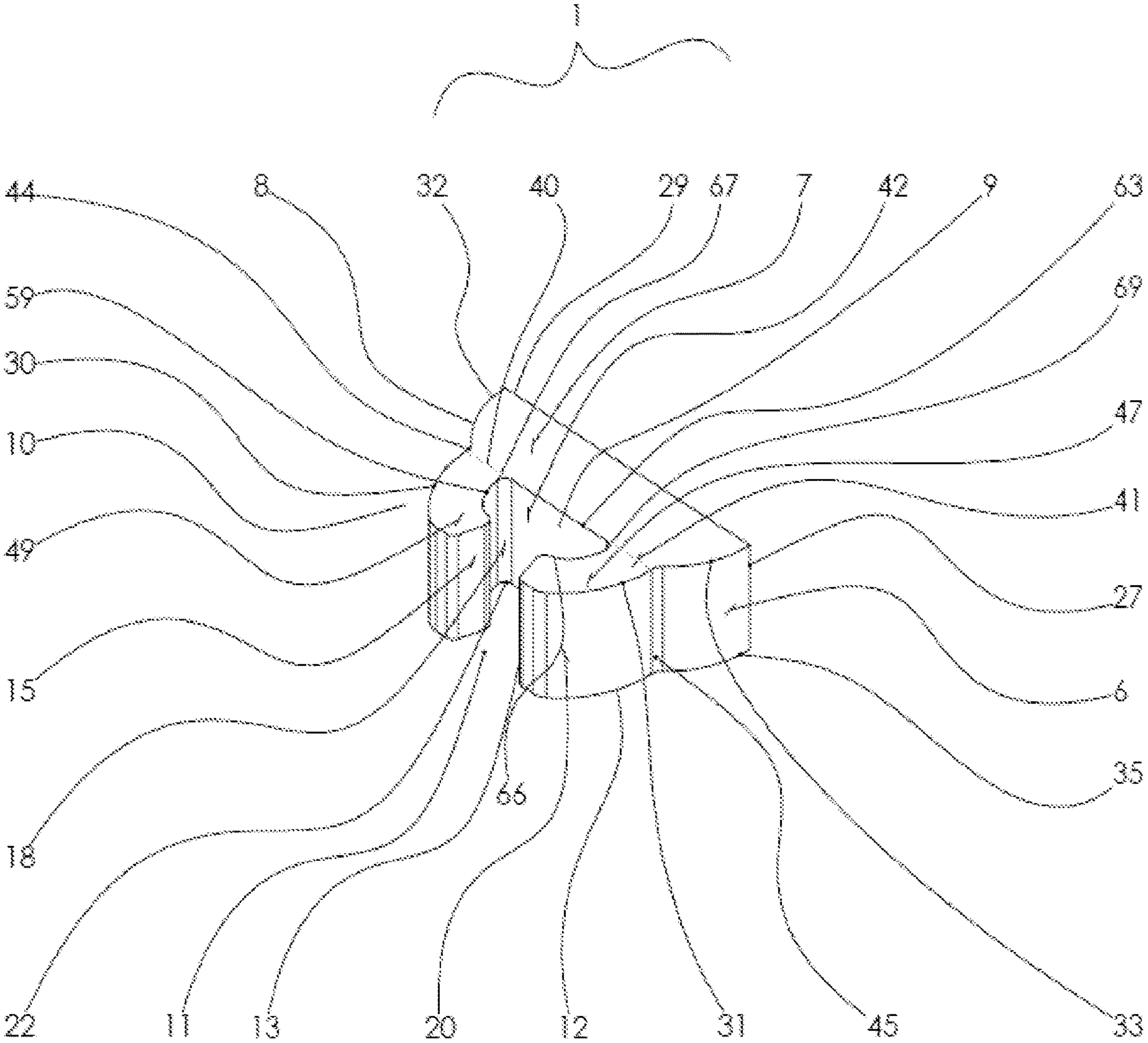
FIG. 3B shows a rear bottom perspective view of an instrument holder in a first exemplary embodiment of the present invention.
Figure 3C:
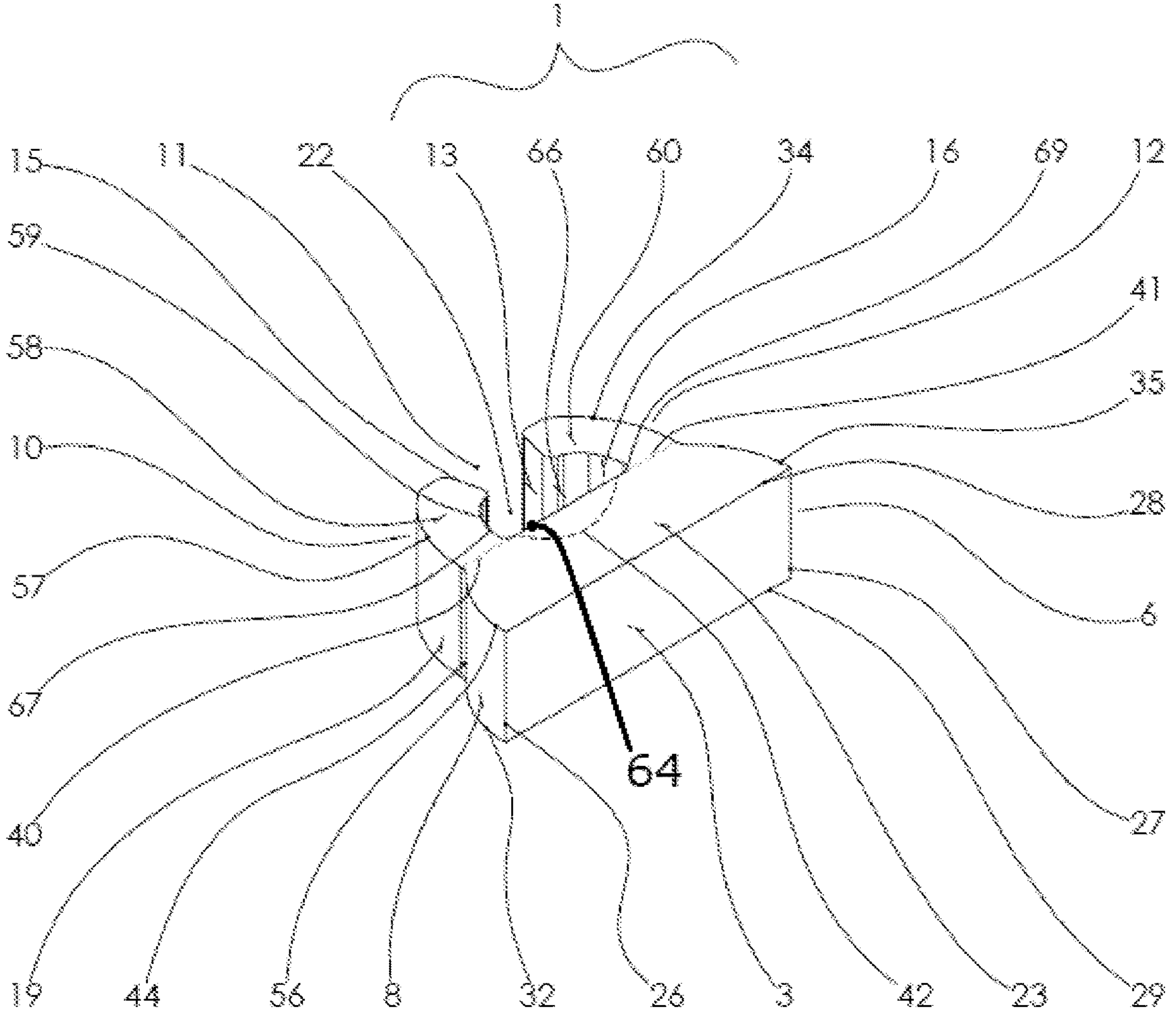
FIG. 3C shows a front plan perspective view of an instrument holder in a first exemplary embodiment of the present invention.

Referring FIGS. 3A, 3B and 3C, instrument holder 1 is shown in this first exemplary embodiment with a body having wall 3 and wall 7 and wall 8 and wall 6 and protrusion 10 and protrusion 12 and surface 19 and surface 20 and wall 23 and opening 11 and protrusion end 15 and interface 27 and interface 35 and interface 33 and interface 34 and interface 31 and surface 16 and surface 18 and cavity 22 and wall 9 and interface 26 interface 30 and interface 32 and interface 28 and interface 29 and end 13 and interface 36 and side portion 40 and side portion 41 and central portion 42 and interface 44 and interface 45 and surface 47 and surface 49 and interface 56 and interface 57 and contact 59 and interface 64 and contact 66 and contact 67 and contact 69 and surface 58 and surface 60 and surface and others not mentioned here.

Referring FIGS. 2A, 2B, 2C 3A, 3B and 3C in this first exemplary embodiment, wall 3 may be described as oriented forwards and as at least one of a first wall and front wall and forward wall and bearing wall of instrument and holder 1, such that wall 3 provides contact with a fixture to support instrument holder system 100, such as contact area 38 of fixture 5 of FIG. 1. Fixture 5 of FIGS. 1, 6A, 6B and 6C may be one of vertical surface and an upright surface and generally upright surface and generally vertical surface and a horizontal surface and a generally horizontal surface and a non-vertical surface and a non-horizontal surface, and others not mentioned here.

Referring FIGS. 3A, 3B and 3C, wall 3 is adjacent to wall 6 and wall 7 and wall 8 and wall 23 sharing and/or forming interface 27 and interface 29 and interface 26 and interface 28 respectively.

Referring FIGS. 3A, 3B and 3C, wall 9 is at least one of a second wall and a back wall of instrument holder 1, and is at least one of distal and opposite wall number 3. Referring FIGS. 3A, 3B, 3C, and 4C, wall 9 is adjacent to wall 7 and wall 23 forming interface 63 and interface 64 respectively. Wall number 3 and wall number 9 may also be one of parallel and generally parallel and not parallel and others mentioned here relative to one another.

Referring FIGS. 3A, 3B and 3C, the surface of wall number 9 is portioned and/or divided into a first side portion 40 and a central portion 42 and a second side portion 41, wherein these portions are side by side and central portion 42 is interposed between first side portion 40 and second side portion 41. Further, while at least one of wall number 3 and 9 are illustrated as generally flat or flat surfaces as shown herein, at least one of wall number 3 and wall number 9 may possess any one of varying geometries comprising at least one of a slope and a ridge and a slant and a curve and a step and others not mentioned here.

Referring FIGS. 3A, 3B and 3C, wall 8 is at least one of a third wall and a left wall of instrument holder 1 and is adjacent to wall 7 and wall 3 and wall 23, forming interface 32, interface 26, and interface 56, respectively.

Referring FIGS. 3A, 3B and 3C, wall 6 is at least one of a fourth wall and a right wall of instrument holder 1 and is at least one of distal and opposite wall 8. Referring FIGS. 3A, 3B and 3C, wall 6 and one 8 may be at least one of generally parallel and parallel and not parallel and others not mentioned here with respect to each other. Referring FIGS. 3A, 3B and 3C, wall 6 is adjacent to wall 7 and wall 3 and wall 23, forming interface 33 and interface 27 and interface 35, respectively.

Referring FIGS. 3A, 3B, 3C, 4A, wall 23 is at least one of a top wall and a fifth wall and is adjacent to wall 9 and wall 3 and wall 8 and wall 6 forming interface 64 and interface 28 and interface 56 and interface 35, respectively. While in this first exemplary embodiment wall 7 is shown generally perpendicular to wall 3, wall 7 and wall 3 may be at least one of perpendicular, not perpendicular, parallel, generally parallel, others not mentioned here.

Referring FIGS. 3A, 3B, 3C, 4C wall 7 is at least one of a bottom wall and a sixth wall and is adjacent to wall 9 and wall 3 and wall 8 and wall 6 forming interface 63, interface 29, interface 32 and interface 33 respectively. While in this first exemplary embodiment wall 7 is shown generally perpendicular to wall 3, one 7 and wall 3 may be at least one of perpendicular, not perpendicular, parallel, generally parallel, others not mentioned here.

Referring FIGS. 3A, 3B, 3C and 4C of this current exemplary embodiment, at least one of wall 6 and wall 8 has an inwardly curved shape originating from interface 27 and interface 26 respectively, biased towards central portion 42 of wall 9 and terminating at interface 45 and 44 respectively. The shape of at least one of wall 6 and wall 8 could also be at least one of a flat surface and perpendicular to wall 3 and at an angle relative to wall 3 and outwardly curved and outwardly sloped and inwardly sloped and others not mentioned here.

Referring FIGS. 3A, 3B and 3C, and 4C at least one of wall 6 and wall 8 abut surface 20 and surface 19 respectively, creating interface 45 and 44 respectively. Referring FIGS. 3A, 3B and 3C of this current exemplary embodiment, at least one of surface 19 and surface 20 has an inwardly curved shape traveling from interface 44 and interface 45 respectively, towards central portion 42 of wall 9, terminating at end 15 and end 13 respectively.

Referring FIGS. 2A, 3A, 3B and 3C in this first exemplary embodiment, protrusion 10, extends outwardly from the first side portion 40 of back wall 9, the first protrusion 10 having inner surface 18 and outer surface 16 and a cantilevered first protrusion end 15, with the inner portion 18 inwardly biased towards opening 11, representing a central portion of instrument 1 such as central portion 40.

Referring FIGS. 2A, 3A, 3B and 3C in this first exemplary embodiment, protrusion 12, extends outwardly from the second side portion 41 of back wall 9, the second protrusion having inner surface 16 and outer surface 20 and a cantilevered second protrusion end 13, with inner portion 16 inwardly biased towards opening 11 and first protrusion end 15. In this first exemplary embodiment, first protrusion end 15 and second protrusion end 13, though biased inwardly and opposing one another, never meet, creating the space of opening 11. In addition, the inwardly curving first protrusion 10 and opposing an inwardly curving second protrusion 12 create cavity 22 of FIGS. 3B, 3C and 4C. Cavity 22 of FIGS. 3B, 3C, 4C provides space for neck 2 of instrument 25 of FIGS. 2A, 2B, 2C to be held by and reside therein holder 1.

Referring FIGS. 3A, 3B, 3C, the size of cavity 22 in a natural and/or unflexed status, such as when instrument 25 is absent from cavity 11, may be at least one of generally the same size and generally smaller than neck 2 of instrument 25. A smaller status of cavity 22 versus neck 2 may be at least one of slightly smaller and smaller and moderately smaller and significantly smaller and others not mentioned here. A smaller cavity 22 in relation to neck 2 status may be illustrated such as by: (1) the natural and/or unflexed distance from contact 67 of first protrusion 10 to contact 69 of FIGS. 3A, 3B and 3C, where neck 2 is absent cavity 22, being smaller compared with (2) the distance from the flexed and/or increased distance from contact 67 of first protrusion 10 to contact 69 of second protrusion 12 of FIGS. 2B, 2C due to the presence of neck 2 in cavity 22 flexibly opening and increasing at least one portion of protrusion 10 and 12 and cavity 22 and others not mentioned here.

Additionally, this illustration of cavity 22 being smaller in the absence of neck 2 therein cavity 22, in relation to cavity 22 containing neck 2 may be further illustrated by: (1) the natural and/or unflexed distance from wall 9 to contact 59 and/or wall 9 to contact 66 of FIGS. 3A, 3B and 3C where neck 2 is absent cavity 22, being smaller compared with (2) the distance from wall 9 to contact 59 and/or wall 9 to contact 66 of FIGS. 2A, 2B, 2C where neck 2 is present in cavity 22 and is flexibly opening at least one portion of protrusion 10 and 12 and cavity 22. Further additionally, this illustration of cavity 22 being smaller in the absence of neck 2 therein cavity 22, in relation to cavity 22 containing neck 2 may be further illustrated by any dimension of at least one of inner surface 18 and inner surface 16 and outer surface 19 and outer surface 20 and any portion of protrusion 10 and protrusion 12 of instrument holder 1, flexibly expanding to accept neck 2 of instrument 25. This difference in size creates a releasable grip of holder 1 thereupon neck 22.

Figure 4A:
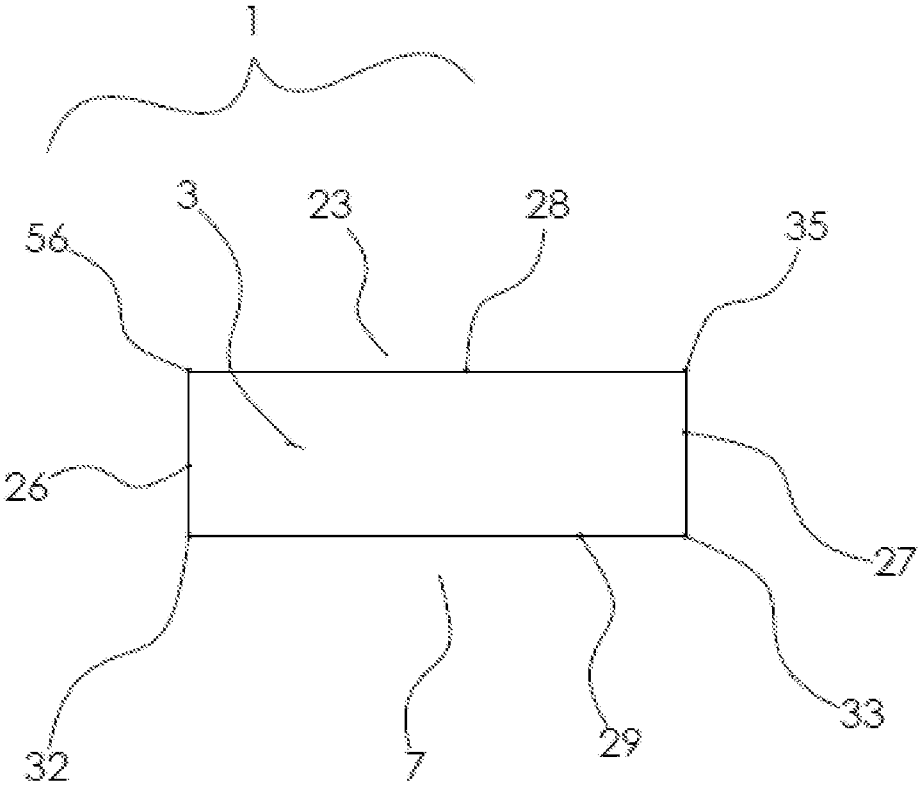
FIG. 4A shows a front view of an instrument holder in a first exemplary embodiment of the present invention.
Figure 4B:
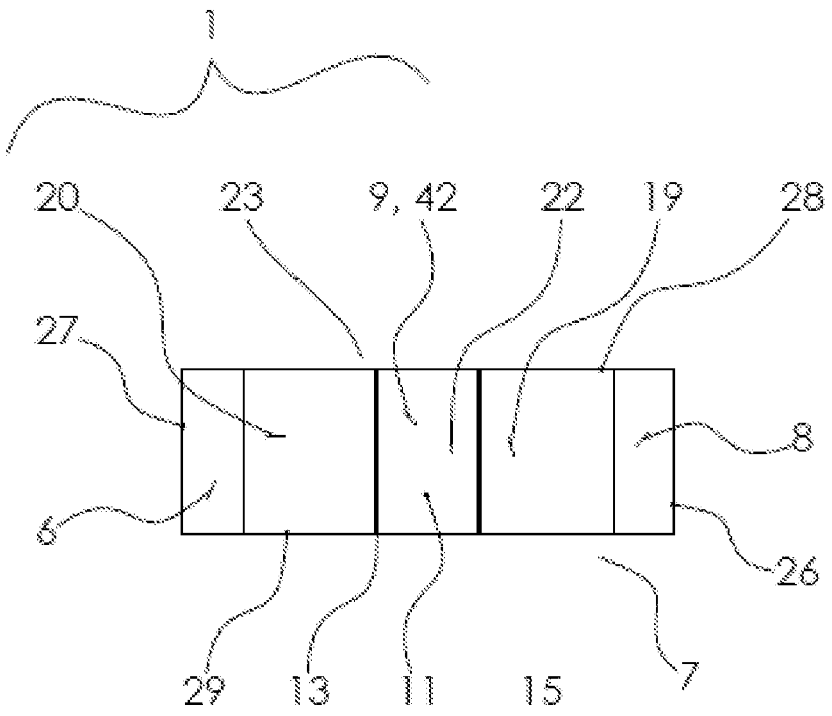
FIG. 4B shows a rear view of an instrument holder in a first exemplary embodiment of the present invention.
Figure 4C:
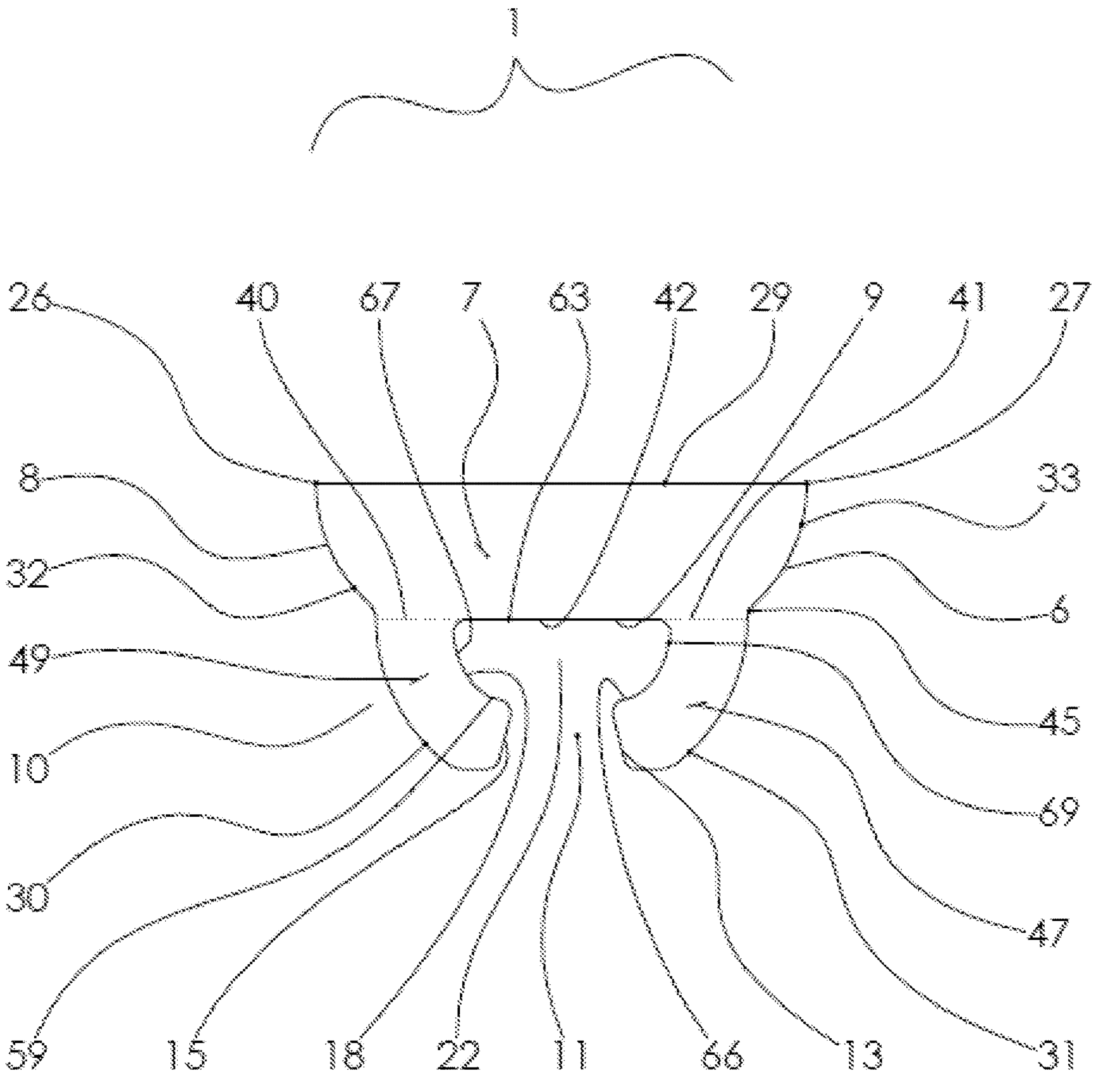
FIG. 4C shows a bottom view of an instrument holder in a first exemplary embodiment of the present invention.

Referring FIG. 4A, instrument holder 1 is illustrated such as from a front view having wall 3 and wall 7 and wall 23 and interface 28 and interface 35 interface 27 interface 33 interface 29 and interface 32 and interface 26 and interface 56. Referring FIG. 4B instrument holder 1 is illustrated such as from a rear view having wall 6 and interface 27 and surface 20 and wall 23 and wall 9, 42 and cavity 22 and surface 19 and interface 28 and one 8 and interface 26 and end 15 and opening 11 and end 13 and interface 29 and others not mentioned here.

Referring FIG. 4C, a view such as a bottom view in this first exemplary embodiment of instrument holder 1 is shown with wall 7 and interface 29 and interface 27 the wall 6 and interface 45 and protrusion 12 and surface 47 and interface 31 and end 13 and opening 11 and cavity 22 and end 15 and interface 30 and protrusion 10 and surface 49 and interface 32 and wall 8 and interface 26 and others not mentioned here.

Figure 5A:
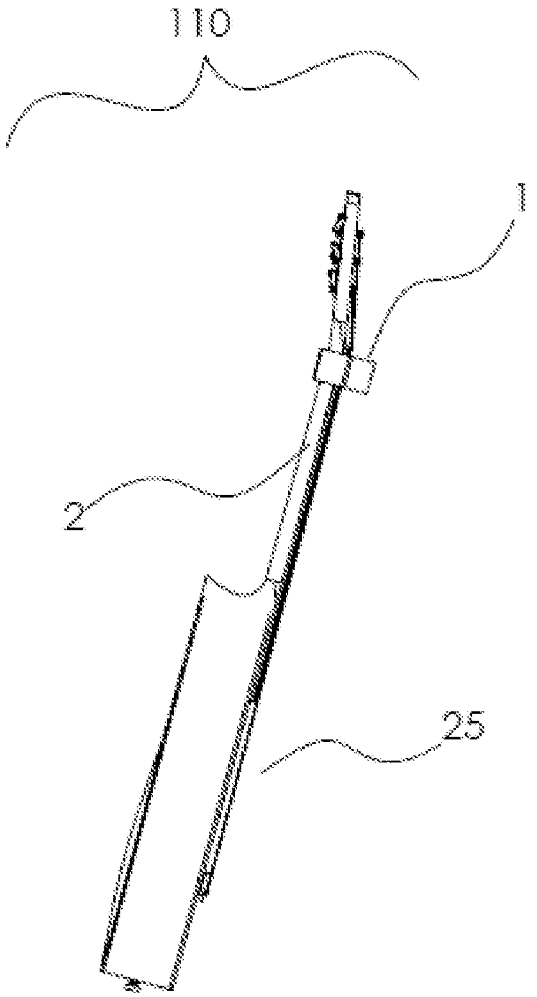
FIG. 5A shows a side view of an instrument holder system, without a fixture, in a first exemplary embodiment of the present invention.
Figure 5B:
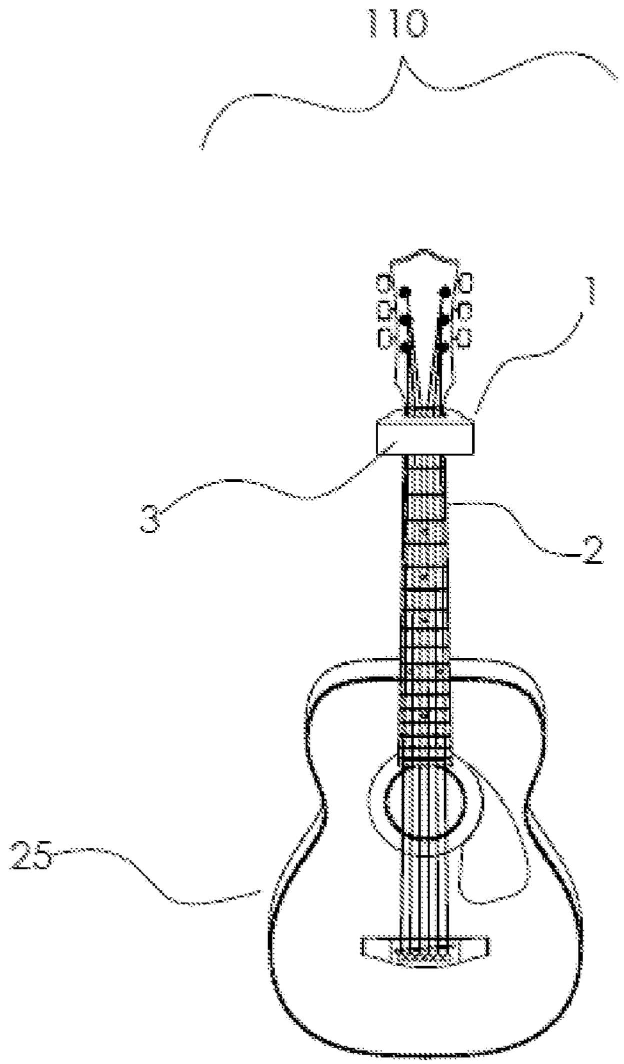
FIG. 5B shows a front view of an instrument holder system, without a fixture, in a first exemplary embodiment of the present invention.

Referring FIG. 5A, instrument and holder system 110 is shown with instrument 25 releasably engaged with instrument order 1 from a side view, fixed surface 5, such as of FIG. 2 is not shown. Referring FIG. 5B, instrument and holder system 110 is shown with instrument 25 releasably engaged with instrument order 1 from a front view, fixed surface 5 is not shown.

Figure 6A:
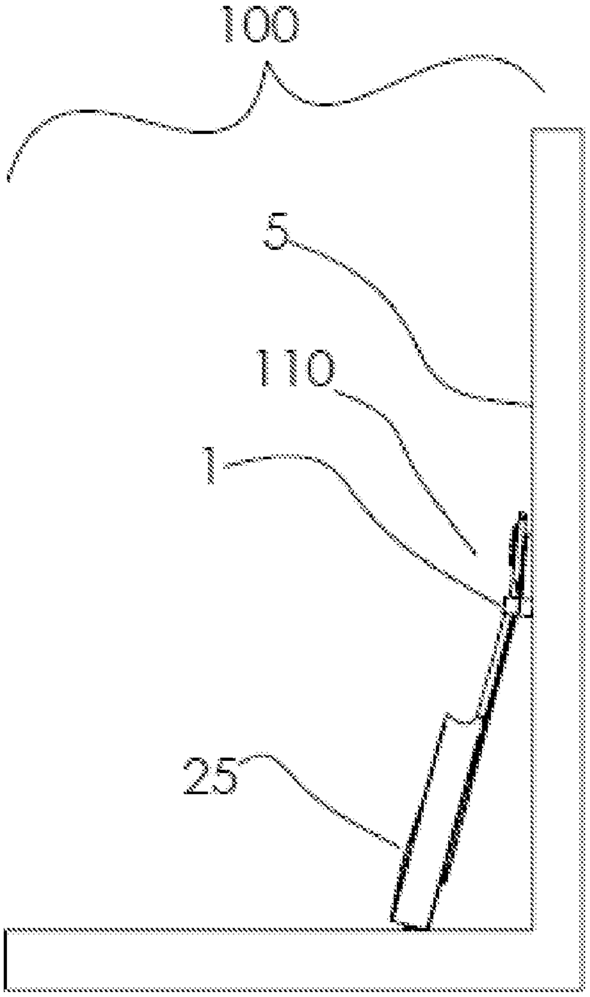
FIG. 6A shows a side view of an instrument holder system with a fixture, in a first exemplary embodiment of the present invention.

Referring FIG. 6A, instrument and holder system 100 is shown from a side view with instrument holder system 110 and vertical surface 5.

Figure 6B:
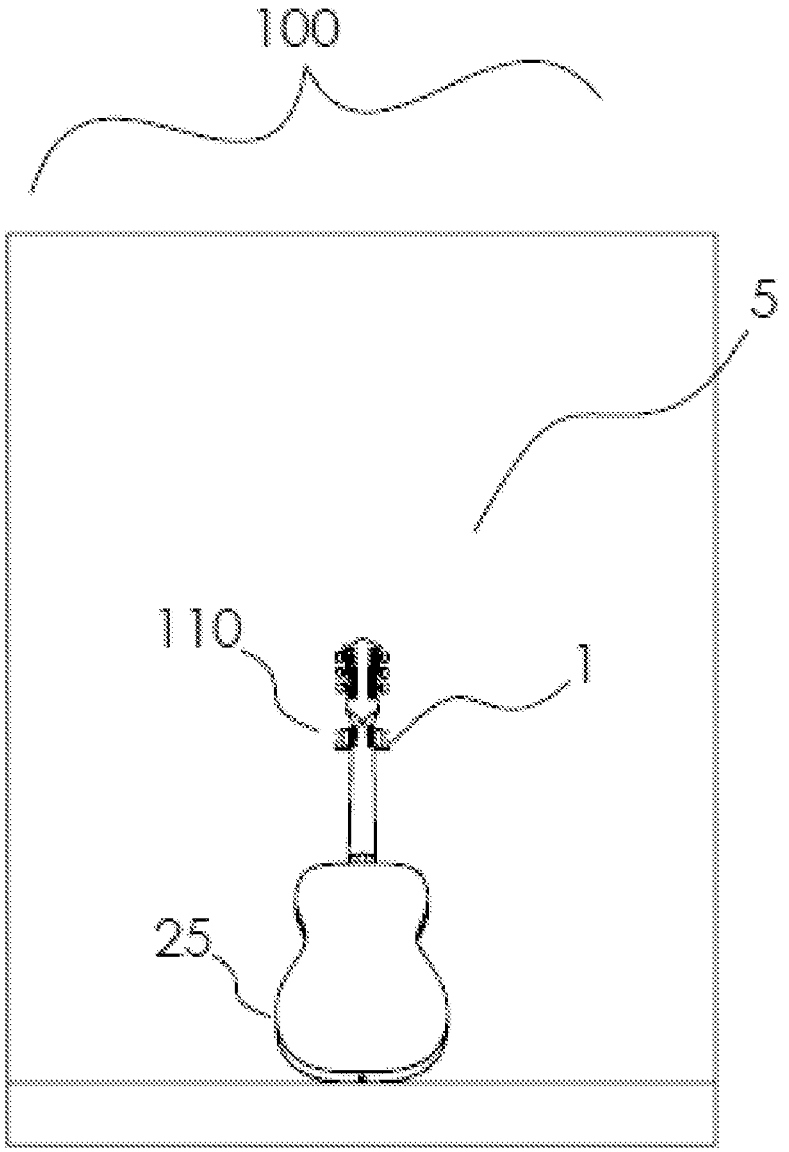
FIG. 6B shows a back and/or rear view of an instrument holder system with a fixture in a first exemplary embodiment of the present invention.

Referring FIG. 6B, instrument holder system 110 illustrates instrument holder 1 and instrument 25 along with vertical surface 5 from a rear view.

Figure 6C:
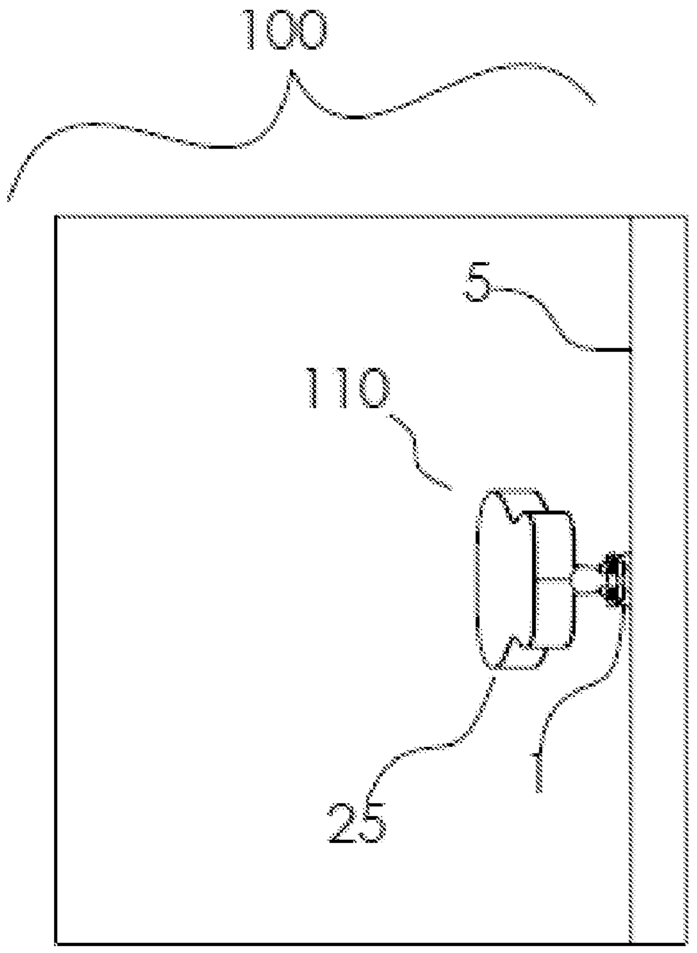
FIG. 6C shows a top and/or plan view of an instrument holder system with a fixture, in a first exemplary embodiment of the present invention.

FIG. 6C, instrument and holder system 100 is shown from a top view with instrument holder system 110 and vertical surface 5.

What is claimed is:

1. An instrument holder apparatus comprising:

a holder body having a first wall and further comprising;

a second wall distal from the first wall, the second wall portioned into a first side portion and a central portion and a second side portion arranged side by side, the central portion interposed between the first side portion and the second side portion;

a third wall and a fourth wall distal to the third wall, and each the third wall and the fourth walls having adjacency with the first wall and second wall, and each sharing an interface with the first wall and the second wall;

a fifth wall and a sixth wall distal to the fifth wall, the fifth and sixth walls each having adjacency with the first wall and the second wall and the third wall and the fourth wall, and each of the fifth and sixth walls sharing an interface with the first wall and the second wall and the third wall and the fourth wall;

a first protrusion extending outwardly from the first side portion of the second wall, the first protrusion having an inner portion and an outer portion and a first protrusion end, with the inner portion inwardly biased towards the central portion of the second wall, a second protrusion, extending outwardly from the second side portion of the second wall distal to the first protrusion, the second protrusion having an inner portion and an outer portion and a second protrusion end, with the inner portion inwardly biased towards the central portion of the second wall, a cavity formed therein between the inner portion of the first protrusion and the inner portion of the second protrusion, the cavity orientated with a first opening oriented towards the fifth wall and a second opening distal the first opening oriented towards the sixth wall; and a third opening formed therebetween the first protrusion end of the first protrusion and the second protrusion end of the second protrusion.

2. The instrument holding apparatus according to claim 1, whereby the first wall and the second wall are at least one of parallel and generally parallel with respect to each other.

3. The instrument holding apparatus according to claim 2 whereby the instrument holder body is at least one of a hexahedron and a cuboid and an elongate.

4. The instrument holding apparatus according to claim 3 whereby the fifth wall and sixth wall are at least one of parallel and generally parallel with respect to each other, and the fifth wall and sixth wall are at least one of perpendicular and generally perpendicular with respect to the first wall and the second wall.

5. The instrument holding apparatus according to claim 3, whereby at least one of the third and fourth wall and the outer portion of the first protrusion and the outer portion of the second protrusion have inward bias towards the central portion of the second wall.

6. The instrument holding apparatus according to claim 4, whereby at least one of the third and fourth wall and the outer portion of the first protrusion in the outer portion of the second protrusion have inward bias towards the central portion of the second wall.

7. The instrument holding apparatus according to claim 5, wherein at least one portion of the instrument holder body and the first protrusion and the second protrusion are flexible.

8. The instrument holder body apparatus according to claim 6, wherein at least one portion of the instrument holding body and the first protrusion and the second protrusion are flexible.

9. The instrument holding apparatus according to claim 7, whereby at least one interface of the holding apparatus body between any two adjacent walls is an edge.

10. The instrument holding apparatus according to claim 8, whereby at least one interface of the holding apparatus body between any two adjacent walls is an edge.

11. An instrument holder system comprising:

an upright surface;

an instrument neck having a front surface and rear surface;

a holder body having a front wall and the holder body further comprising;

a holder body back wall distal from the holder body front wall, the back wall portioned into a first side portion and a second side portion arranged side by side;

a holder body left side wall and a holder body right side wall distal to the holder body left side wall, the holder left side wall having adjacency and sharing an interface with the front wall and the back wall, and the holder body right wall having adjacency and sharing an interface with the front wall and the back wall;

a holder body top wall and a holder body bottom wall distal to the top wall, the top wall having adjacency and sharing an interface with the holder body front wall and the holder body back wall and the holder body left side wall and the holder body right side wall, and the bottom wall having adjacency and sharing an interface with the holder body front wall and the holder body back wall and the holder body left side wall and the holder body right side wall;

a first cantilevered protrusion with an inner surface and an outer surface, the first protrusion extending therefrom the first side portion of the back wall and having a cantilevered end, with the inside surface of the first cantilevered protrusion curving inwards towards the second side portion of the second wall;

a second cantilevered protrusion with an inner surface and an outer surface, the second protrusion extending therefrom the second side portion of the back wall, with the inside wall of the second protrusion curving inwards towards the first side portion of the back wall;

a cavity formed therein by a portion of the back wall and the inner surface of the first cantilevered protrusion and the inner wall of the second cantilevered protrusion, the cavity having an opening formed between the first cantilevered protrusion end and the second cantilevered protrusion end;

the instrument releasably interposed in the cavity; and the front wall of the holder supported by the upright surface.

12. The system according to the claim 11, whereby the interposed neck forward surface is oriented coincident with the back wall of the holder body.

13. The system according to the claim 11, whereby the interposed neck rear surface is oriented coincident with the back wall of the holder body.

14. The instrument holding apparatus according to claim 11, whereby the front wall and the back wall are at least one of parallel and generally parallel with respect to each other.

15. The system according to the claim 11, whereby at least one of the first protrusion and second protrusion and holder body is flexible.

16. The system according to the claim 14, whereby at least one of the first protrusion and second protrusion and holder body is flexible.

17. The instrument holding apparatus according to claim 15 whereby the instrument holder body is at least one of a hexahedron and a cuboid and an elongate.

* * * * *